United States Patent [19]

Yoshikawa et al.

[11] Patent Number: 5,630,492

[45] Date of Patent: May 20, 1997

[54] OIL SUPPLYING AND DISCHARGING STRUCTURE FOR CANCELLER IN HYDRAULIC CLUTCH

[75] Inventors: Haruhiko Yoshikawa; Kazuhisa Yamamoto; Yoichi Kojima; Yoshihiro Kodama, all of Saitama, Japan

[73] Assignee: Honda Giken Kogyo Kabushiki Kaisha, Tokyo, Japan

[21] Appl. No.: 501,961

[22] Filed: Jul. 13, 1995

[30] Foreign Application Priority Data

Jul. 13, 1994 [JP] Japan .................. 6-160889

[51] Int. Cl.$^6$ .................. F16D 25/0638; F16D 25/06
[52] U.S. Cl. .................. 192/106 F; 192/85 AA
[58] Field of Search .................. 192/106 F, 85 AA, 192/87.1, 87.11, 87.12, 87.13, 115

[56] References Cited

U.S. PATENT DOCUMENTS

| | | |
|---|---|---|
| 3,243,026 | 3/1966 | Snoy et al. . |
| 4,458,797 | 7/1984 | Hawkins .................. 192/52 |
| 4,741,422 | 5/1988 | Fuehrer et al. .................. 192/106 F X |
| 4,957,195 | 9/1990 | Kano et al. .................. 192/106 F |
| 4,982,826 | 1/1991 | Holbrook .................. 192/106 F |
| 5,069,657 | 12/1991 | Taniguchi et al. .................. 192/87.11 X |
| 5,172,799 | 12/1992 | Iijima et al. .................. 192/106 F |
| 5,421,439 | 6/1995 | Hayasaki .................. 192/85 AA |
| 5,439,088 | 8/1995 | Michioka et al. .................. 192/106 F X |

FOREIGN PATENT DOCUMENTS 2296072 12/1990 Japan .
2296073 12/1990 Japan .

Primary Examiner—Rodney H. Bonck
Attorney, Agent, or Firm—Lyon & Lyon

[57] ABSTRACT

A support shaft is fixed to a casing of a transmission. A main shaft is relatively rotatably fitted to an inner periphery of the support shaft with a needle bearing interposed therebetween, and a clutch hub is relatively rotatably fitted to an outer periphery of the support shaft. An annular groove is defined around the outer periphery of the support shaft and divided into an oil discharge groove and an oil supply groove by a pair of weirs. An oil supplied from an oil passage is supplied to a canceller oil chamber through the oil supply groove and oil holes in the clutch hub. The oil in the canceller oil chamber is discharged through the oil holes, the oil discharge groove, oil passages in the support shaft, the needle bearing and oil passages in the main shaft. Thus, it is possible to quickly supply and discharge the oil into and from the canceller oil chamber in the hydraulic clutch, thereby preventing a failure of engagement of the hydraulic clutch at the starting of an engine at a low temperature and a dragging of the hydraulic clutch after the starting of an engine.

9 Claims, 4 Drawing Sheets

1

OIL SUPPLYING AND DISCHARGING STRUCTURE FOR CANCELLER IN HYDRAULIC CLUTCH

BACKGROUND OF THE INVENTION

1. Field of the Invention

The present invention relates to an oil supplying and discharging structure for a canceller in a hydraulic clutch including a clutch drum, a clutch piston and a canceller plate which are supported around an outer periphery of a rotary shaft to define a clutch oil chamber between the clutch drum and the clutch piston and a canceller oil chamber between the clutch piston and canceller plate.

Incidentally, the term "oil" used throughout this specification should be understood to cover also any appropriate fluid other than oil, that may be usable for the invention.

2. Description of the Prior Art

Such oil supplying and discharging structures for cancellers in hydraulic clutches are known from Japanese Patent Applications Laid-open Nos. 296072/90 and 296073/90.

There is a problem that if an oil in the canceller oil chamber is not quickly discharged after stopping of an engine, the oil remaining in the canceller oil chamber obstructs and affects the quick engagement of the hydraulic clutch especially at a low temperature at which the viscosity of the oil increases. There is also a problem that if the oil is not quickly supplied to the canceller oil chamber after starting of the engine, a centrifugal hydraulic pressure applied to the oil remaining in the clutch oil chamber cannot be satisfactorily canceled, thereby developing a drag phenomenon on the hydraulic clutch.

In this manner, it is desirable that the oil is quickly discharged from the canceller oil chamber after stopping of the engine and also quickly supplied to the canceller oil chamber after starting of the engine. However, the known structure suffers from a problem that it is difficult to quickly supply and discharge the oil, because of complicated oil supplying and discharging paths connected to the canceller oil chamber.

SUMMARY OF THE INVENTION

Accordingly, it is an object of the present invention to quickly supply and discharge the oil to and from the canceller oil chamber.

To achieve the above purpose, according to the present invention, there is provided a hydraulic clutch having an oil supplying and discharging structure for a canceller in the hydraulic clutch which includes a clutch drum, a clutch piston and a canceller plate which are all supported around an outer periphery of a rotary shaft to define a clutch oil chamber between the clutch drum and the clutch piston and to define a canceller oil chamber between the clutch piston and canceller plate, the oil supplying and discharging structure comprising a stationary shaft fitted to an inner periphery of the clutch drum and an annular groove which is defined around an outer periphery of the stationary shaft and which is divided into an oil supply groove and an oil discharge groove by a weir means, the oil supply groove and the oil discharge groove being in communication with the canceller oil chamber through a plurality of oil holes disposed circumferentially of the rotary shaft.

With the above construction, it is possible to quickly discharge the oil from the canceller oil chamber via the oil holes and the oil discharge groove upon stopping of the engine operation, and to quickly supply the oil to the canceller oil chamber via the oil supply groove and the oil holes at the start of the engine operation. Thus, it is possible to eliminate the problem that when the engine is restarted after a lapse of a long time from the stoppage of the engine operation, especially in a cold season, a large volume of oil having an increased viscosity due to a drop in temperature remains in the canceller oil chamber to obstruct the engagement of the hydraulic clutch. Moreover, it is possible to quickly supply the oil to the canceller oil chamber after the start of the engine to compensate for the hydraulic pressure caused by centrifugal force.

In addition to the above construction, if a check valve is interposed between the oil supply groove and the oil discharge groove, the excess pressure on the oil supply groove side can escape to the oil discharge groove side.

The above and other objects, features and advantages will become apparent from the following description of the preferred embodiment taken in conjunction with the accompanying drawings.

DESCRIPTION OF THE PREFERRED EMBODIMENT

Figure 1:
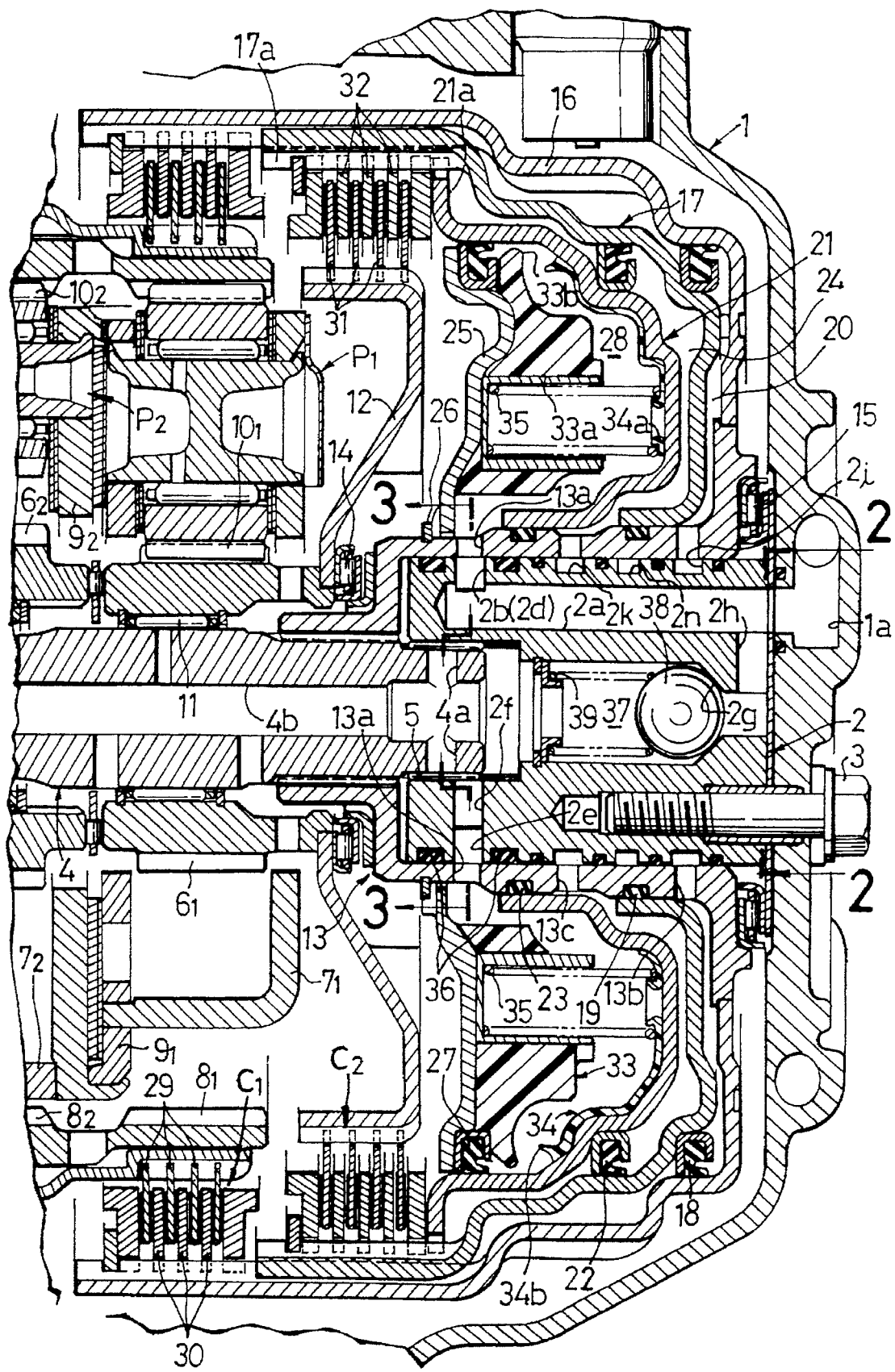
FIG. 1 is a partially sectional view of a transmission for a vehicle to which an embodiment of the present invention is applied.

Referring to FIG. 1, a support 2 as a stationary shaft is fixed at its right end to an inner surface of a casing 1 of a transmission by three bolts 3. A right end of a main shaft 4 is rotatably received in a left end of the support 2 with a needle bearing 5 interposed therebetween.

A first planetary gear mechanism $P_1$ of a single planetary gear type and a second planetary gear mechanism $P_2$ of a double planetary gear type are axially juxtaposed around an outer periphery of the main shaft. The first and second planetary gear mechanisms $P_1$ and $P_2$ include sun gears $6_1$ and $6_2$, planetary carriers $7_1$ and $7_2$, and ring gears $8_1$ and $8_2$, respectively. The planetary carriers $7_1$ and $7_2$ are integrally coupled together through center plates $9_1$ and $9_2$, and the ring gears $8_1$ and $8_2$ are formed integrally with each other. A plurality of planetary gears $10_1$ are carried on the planetary carrier $7_1$ and meshed simultaneously with the sun gear $6_1$ and the ring gear $8_1$. Also, a plurality of inner planetary gears (not shown) are carried on the planetary carrier $7_2$ and meshed with the sun gear $6_2$, and a plurality of outer planetary gears $10_2$ are meshed with the ring gear $8_2$. The unshown inner planetary gears and outer planetary gears $10_2$ are meshed with each other in a conventional manner.

The ring gears $8_1$ and $8_2$ formed integrally with each other are connected to the main shaft 4 through a first clutch $C_1$. The sun gear $6_1$ of the first planetary gear mechanism $P_1$ is rotatably carried on the main shaft 4 with a needle bearing 11 interposed therebetween. A sun gear restraining member 12 is integrally coupled to the sun gear $6_1$ to extend radially outwardly and also coupled to the main shaft 4 through a second clutch $C_2$.

The structures of the first clutch $C_1$ and the second clutch $C_2$ will be described below.

A clutch hub 13 is spline-coupled to a right end of the main shaft 4 and relatively rotatably fitted over an outer periphery of the support 2 to constitute a rotary shaft in the present invention. A thrust bearing 14 is interposed between the clutch hub 13 and the sun gear restraining member 12, and a thrust bearing 15 is also interposed between the clutch hub 13 and the casing 1. A clutch drum 16 is secured to a right end of the clutch hub 13 and extends along an inner wall surface of the casing 1, until its left side reaches a radially outer side of the ring gear $8_1$ of the first planetary gear mechanism $P_1$.

A first clutch piston 17 is relatively non-rotatably and axially slidably received in between an outer periphery of the clutch hub 13 and an inner periphery of the clutch drum 16 with seal members 18 and 19 interposed therebetween, and a first clutch oil chamber 20 is defined between the clutch drum 16 and the first clutch piston 17. A second clutch piston 21 is also relatively non-rotatably and axially slidably received in between the outer periphery of the clutch hub 13 and an inner periphery of the first clutch piston 17 with seal members 22 and 23 interposed therebetween, and a second clutch oil chamber 24 is defined between the first clutch piston 17 and the second clutch piston 21. A canceller plate 25 is fixed at its inner periphery to the clutch hub 13 by a clip 26 and slidably fitted at its outer periphery to an inner periphery of the second clutch piston 21 with a seal member 27 interposed therebetween. A canceller oil chamber 28 is defined between the second clutch piston 21 and the canceller plate 25.

The first clutch $C_1$ includes a plurality of clutch plates 29 relatively non-rotatably and axially slidably engaged with the ring gear $8_1$, and a plurality of clutch plates 30 placed alternately between the clutch plates 29 and relatively non-rotatably and axially slidably engaged with the inner periphery of clutch drum 16. The clutch plates 29 and 30 can be urged by an urging portion 17a at a tip end of the leftwardly moving first clutch piston 17 to come into close contact with each other. The second clutch $C_2$ includes a plurality of clutch plates 31 relatively non-rotatably and axially slidably engaged with the sun gear restraining member 12, and a plurality of clutch plates 32 placed alternately between the clutch plates 31 and relatively non-rotatably and axially slidably engaged with the inner periphery of first clutch piston 17. The clutch plates 31 and 32 can be urged by an urging portion 21a at a tip end of the leftwardly moving second clutch piston 21 to come into close contact with each other.

Paddings 33 and 34 of a synthetic resin are mounted on a right side of the canceller plate 25 and a left side of the second clutch piston 21 to lie within the canceller oil chamber 28. The padding 33 has a relatively large volume, and includes a plurality of spring seats 33a provided in a recessed manner in a radially inner side thereof at circumferentially spaced-apart locations, and a projection 33b formed on a radially outer side thereof for preventing dust from being deposited onto the seal member 27. The padding 34 has a relatively small volume, and includes a plurality of spring seats 34a in a protruding manner in a radially inner side thereof at circumferentially spaced-apart locations, and a projection 34b formed on a radially outer side thereof for preventing dust from being deposited onto the seal member 27. A plurality of return springs 35 are mounted under compression between the spring seats 33a and 34a of the paddings 33 and 34 for biasing the second clutch piston 21 rightwardly.

The provision of the paddings 33 and 34 makes it possible to reduce the waste space or volume within the canceller oil chamber 28 and to increase the inside diameter of the remaining oil at the start of the operation of the engine.

The structure for supplying and discharging the oil to and from the canceller oil chamber 28 will be described below with additional reference to FIGS. 2 and 3.

An oil passage 1a is defined in the casing and connected to an oil pump (not shown). The oil passage 1a is in communication with an oil passage 2a axially defined in the support 2 eccentrically from a central axis. A left end of the oil passage 2a is in communication with an annular groove 2b provided around the outer periphery of the support 2. The annular groove 2b is partitioned into an oil supplying groove 2d of a minor arc and an oil discharge groove 2e of a major arc by a pair of weirs 2c. The oil passage 2a opens into the oil supply groove 2d. Because the oil supply groove 2d and the oil discharge groove 2e are defined by partitioning the annular groove 2b by the pair of weirs 2c, it is possible to reduce the machining cost for the oil supply groove and the oil discharge groove and to effectively utilize the space. The clutch hub 13 closing the outer periphery of the annular groove 2b has eight oil holes 13a circumferentially equally spaced apart from one another. These oil holes 13a are in communication with the canceller oil chamber 28. The annular groove 2b and the clutch hub 13 are sealed to each other by a pair of seals 36.

Furthermore, the oil discharge groove 2e is in communication with the needle bearing 5 via oil passages 2f provided diametrically through the support 2. The oil discharge groove 2e is further in communication with an oil passage 4b axially provided through the main shaft 4 via oil passages 4a provided diametrically through the right end of the main shaft 4.

A check valve 37 is positioned at the center of the support 2, and includes a valve seat 2g, a ball 38 seatable on the valve seat 2g, and a spring 39 for biasing the ball 38 toward the valve seat 2g. A portion upstream of the valve seat 2g is in communication with the oil passage 2a through an oil passage 2h radially defined along the right end of the support 2, and a portion downstream of the valve seat 2g is in communication with the oil passage 4b in the main shaft 4.

Figure 2:
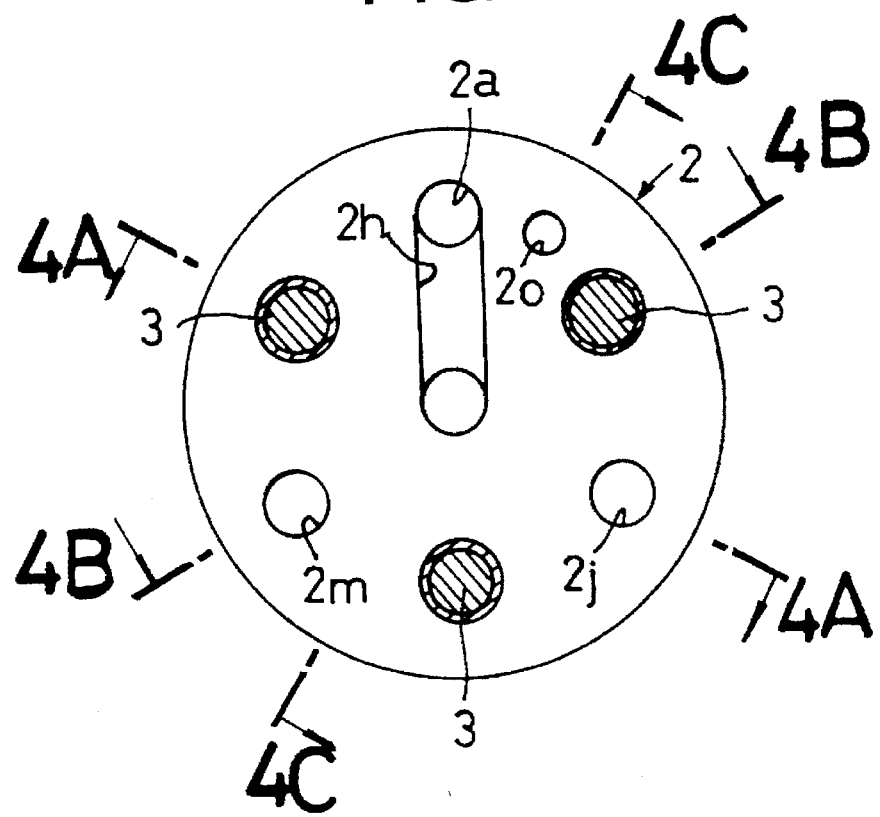
FIG. 2 is a view taken along a line 2—2 in FIG. 1.
Figure 3:
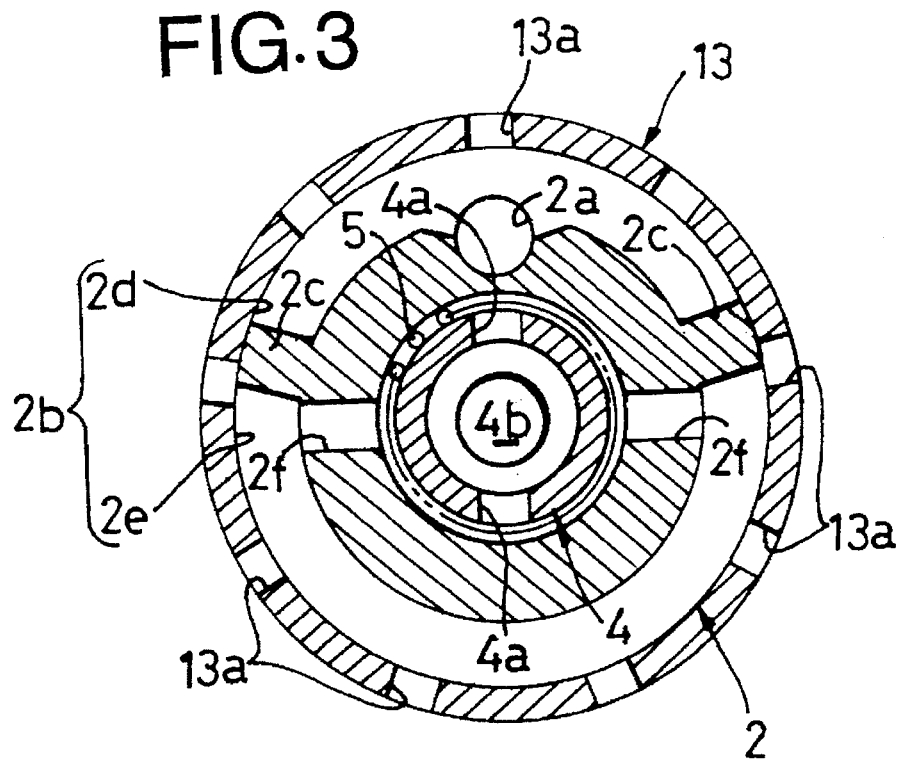
FIG. 3 a sectional view taken along a line 3—3 in FIG. 1.
Figure 4A:
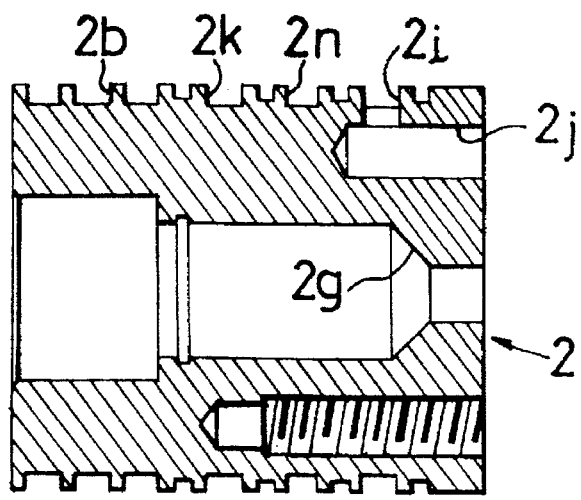
FIGS. 4A, 4B and 4C are sectional views taken along lines 4A—4A, 4B—4B, and 4C—4C in FIG. 2, respectively.
Figure 4B:
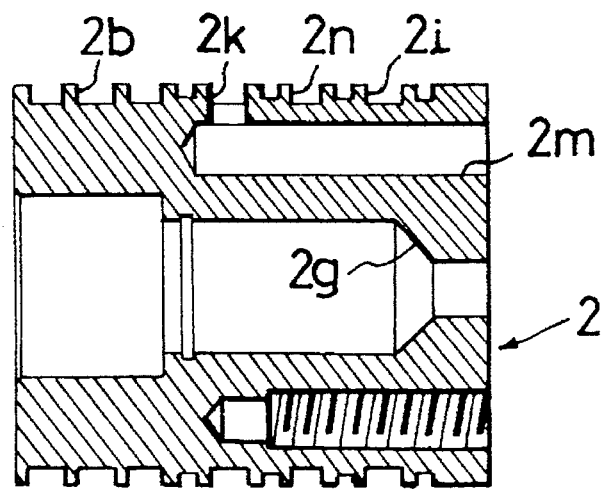
Figure 4C:
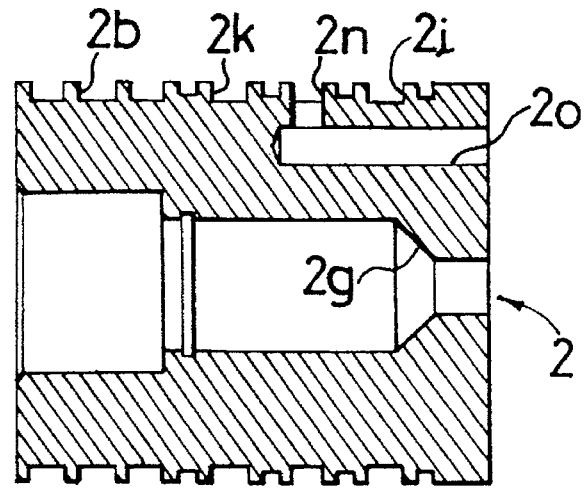

As can be seen by reference to FIGS. 1 to 3 along with FIGS. 4A, 4B and 4C, the first clutch oil chamber 20 of the first clutch CHd 1is in communication with an oil passage (not shown) defined in the casing 1 through a plurality of oil passages 13b defined in the clutch hub 13, an annular groove 2i defined in the outer periphery of support 2, and an oil passage 2j axially defined in the support 2 (see FIG. 4A). The second clutch oil chamber 24 of the second clutch $C_2$ is in communication with an oil passage (not shown) defined in the casing 1 through a plurality of oil holes 13c defined in the clutch hub 13, an annular groove 2k defined in the outer periphery of the support 2, and an oil passage 2m axially defined in the support 2 (see FIG. 4B). Further, a draining annular groove 2n is defined in the outer periphery of the support 2 to come into communication with an oil passage (not shown) defined in the casing 1 through an oil passage 2o axially defined in the support 2.

The following is the description of the embodiment of the present invention having the above-described construction.

When a working oil is supplied to the oil passage 2j to bring the first clutch $C_1$ into an engaged state, the working oil flows from the oil passage $2j$ via the annular groove $2i$ and the oil holes $13b$ into the first clutch oil chamber 20, causing the first clutch piston 17 to move leftwardly. As a result, the clutch plates 29 and 30 are brought into close contact with one another to achieve the engagement of the first clutch $C_1$, causing the ring gears $8_1$ and $8_2$ of the first and second planetary gear mechanisms $P_1$ and $P_2$ to be coupled to the main shaft 4 through the clutch plates 29, the clutch plates 30, the clutch drum 16 and the clutch hub 13. When the first clutch piston 17 is moved leftwardly, the second clutch piston 21 is also moved leftwardly along with the first clutch piston 17. However, the relative positional relationship between the first and second clutch pistons 17 and 21 is maintained constant and hence, the second clutch $C_2$ cannot be brought into an engaged state.

If the working oil is supplied to the oil passage $2m$ to bring the second clutch $C_2$ into the engaged state, the working oil flows from the oil passage $2m$ via the annular groove $2k$ and the oil holes $13c$ into second oil chamber 24, causing the second clutch piston 21 to move leftwardly. As a result, the clutch plates 31 and 32 are brought into close contact with each other to achieve the engagement of the second clutch $C_2$, causing the sun gear $6_1$ of the first planetary gear mechanism $P_1$ to be coupled to the main shaft 4 through the sun gear restraining member 12, the clutch plates 31, the clutch plates 32, the first clutch piston 17, the clutch drum 16 and the clutch hub 13.

The working oil leaked from the annular grooves $2i$ and $2k$ to the sliding surfaces of the support 2 and the clutch hub 13 is discharged through the annular groove $2n$ and the oil passage $2o$.

The first and second clutch oil chambers 20 and 24 are rotated together with the main shaft 4 and therefore, the centrifugal force acting on the working oil within the first clutch oil chamber 20 urges the first clutch piston 17 leftwardly relative to the clutch drum 16. Such urging force is also transmitted to the second clutch piston 21. Further, the centrifugal force acting on the working oil within the second clutch oil chamber 24 urges the second clutch piston 21 leftwardly relative to the first clutch piston 17.

On the other hand, the canceller oil chamber 28 is rotated together with the main shaft 4 and therefore, the centrifugal force acting on the lubrication oil within the canceller oil chamber 28 urges the second clutch piston 21 rightwardly relative to the canceller plate 25. Such urging force is also transmitted to the first clutch piston 17. In this manner, the centrifugal force acting on the working oil within the first and second clutch oil chambers 20 and 24 can be balanced with the centrifugal force acting on the lubrication oil within the canceller oil chamber 28 to compensate for the effect of the centrifugal forces.

The lubrication oil supplied from the hydraulic pump during operation of the engine is supplied into the canceller oil chamber 28 by way of the oil passage $1a$ in the casing 1, the oil passage $2a$ in the support 2, the oil supply groove $2d$ in the support 2 and the oil holes $13a$ in the clutch hub 13. The surplus lubrication oil is discharged from the canceller oil chamber 28 by way of the oil holes $13a$ in the clutch hub 13, the oil discharge groove $2e$ in the support 2, oil passages $2f$ in the support 2, the needle bearing 5 and the oil passages $4a$ in the main shaft into the oil passage $4b$ in the main shaft 4. This lubrication oil is then supplied from the oil passage $4b$ to each of the portions to be lubricated in the transmission. During this time, when the supply pressure of the lubrication oil becomes too large, the ball 38 of the check valve 37 is unseated from the valve seat $2g$ against the force of the spring 39, permitting the lubrication oil to be discharged from the oil passage $2h$ in the support 2 into the oil passage $4b$ in the main shaft 4 to bypass the canceller oil chamber 28. This prevents an adverse effect on the pressure adjusting performance of a regulator valve (not shown) provided in the lubrication oil supply path.

When the engine is stopped, the supplying of the lubrication oil to the canceller oil chamber 28 is also stopped, and the lubrication oil in the canceller oil chamber 28 is discharged into the oil passage $4b$ in the main shaft 4 by way of the oil holes $13a$ in the clutch hub 13, the oil discharge groove $2e$ in the support 2, the oil passages $2f$, $2f$ in the support 2, the needle bearing 5 and the oil passages $4a$, $4a$ in the main shaft 4. During this time, a predetermined amount of the lubrication oil is quickly discharged from the canceller oil chamber 28, because there is no constriction existing in the lubrication oil discharge path extending from the canceller oil chamber 28 to the oil passage $4b$ in the main shaft 4.

If a satisfactory amount of the lubrication oil should not be discharged from the canceller oil chamber 28 when the engine is stopped, there is a possibility, especially at the cold start of the engine in cold climates, that the viscosity of the lubrication oil remaining in the canceller oil chamber 28 may be increased, obstructing the leftward movement of the first and second clutch pistons 17 and 21, resulting in a delayed engagement of the first and second clutches $C_1$ and $C_2$. However, because the predetermined volume of lubrication oil is quickly discharged from the canceller oil chamber 28 as mentioned above in the embodiment of this invention, there is no possibility that the engagement of the first and second clutches $C_1$ and $C_2$ is delayed when the engine is restarted.

Also, when the engine is started, the lubrication oil from the hydraulic pump is supplied into the canceller oil chamber 28 through the oil passage $1a$, the oil passage $2a$, the oil supply groove $2d$ and the oil holes $13a$. During this time, the lubrication oil can be supplied to the canceller oil chamber 28 quickly after starting of the engine to compensate for the effect of the centrifugal force on the lubrication oil in the first and second clutch oil chambers 20 and 24, because there is no constriction existing in the lubricating supply path extending from the oil passage $1a$ to the canceller oil chamber 28.

Figure 5:
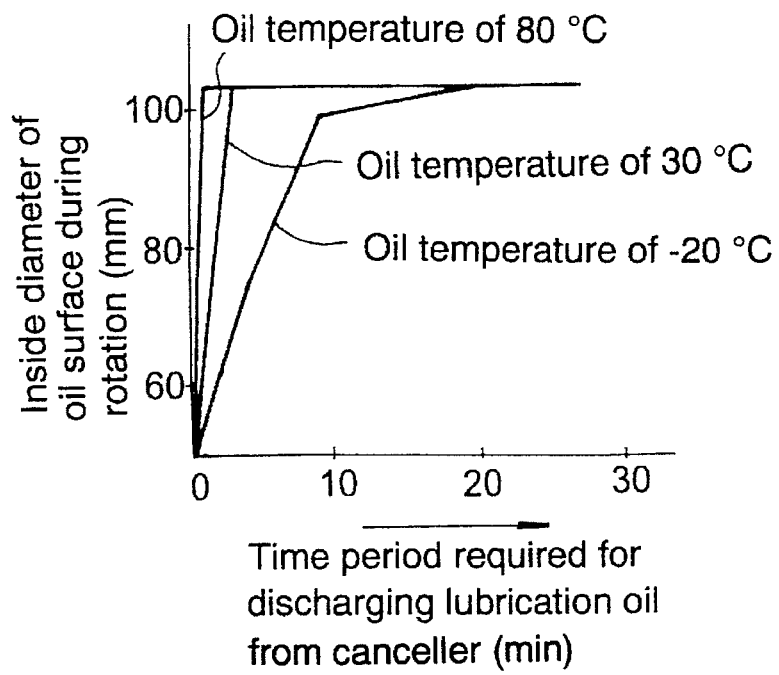
FIG. 5 is a graph illustrating the characteristics of discharging of oil from a canceller.

FIG. 5 is a graph made by plotting the inside diameter of the oil surface during rotation (i.e., the inner diameter of the oil surface when the lubrication oil in the canceller oil chamber 28 is formed into a ring-like shape by the centrifugal force) versus the period of time for discharging of the lubrication oil from the canceller (i.e., the elapsed time from the stoppage of the engine) at oil temperatures of 80° C., 30° C. and −20° C. It can be seen from this graph that a minimum amount (inside diameter during rotation=103 mm) of the lubrication oil is discharged from the canceller oil chamber 28 in no more than about 1 minute at the oil temperature of 80° C. and in about 3 minutes at the oil temperature of 30° C., and most of the lubrication oil is discharged in 10 minutes even at the oil temperature of −20° C.

Figure 6:
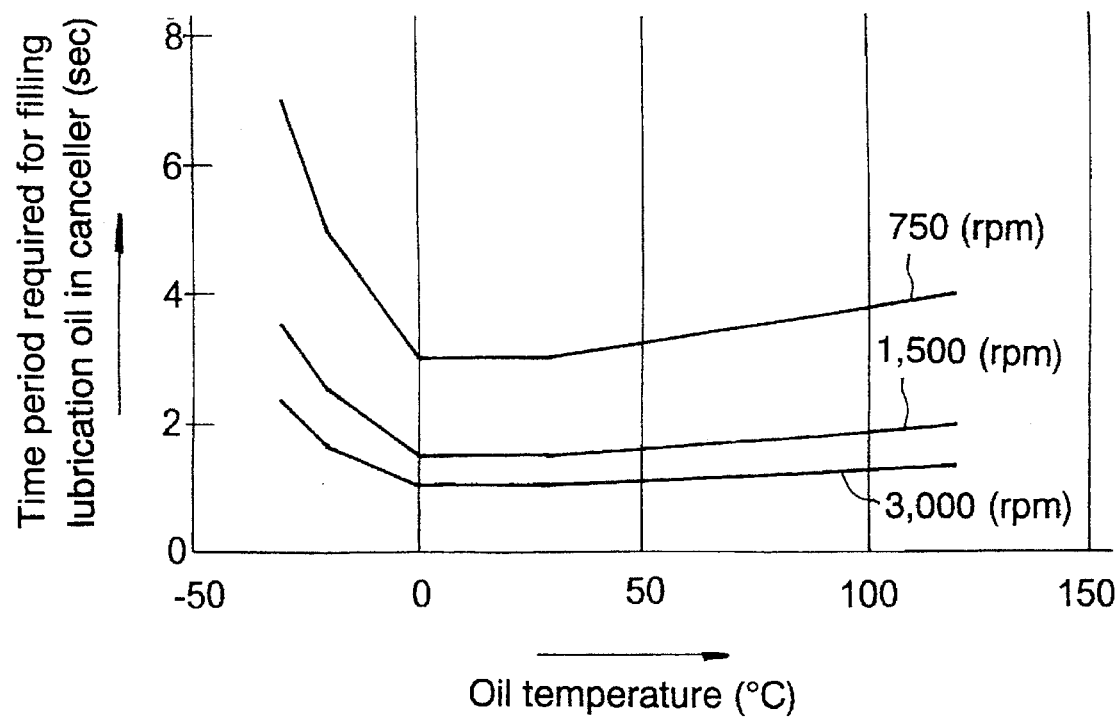
FIG. 6 is a graph illustrating characteristics of supplying of oil from the canceller.

FIG. 6 is a graph made by plotting the time taken for the lubrication oil to fill up the canceller (i.e., the time taken for the amount of the lubrication oil filled in the canceller oil chamber 28 to reach a maximum value from a minimum value after starting of the engine) versus the temperature at the engine revolution-numbers of engine of 750 rpm, 1,500 rpm, and 3,000 rpm. It can be seen from this graph that even at the engine revolution-number of 750 rpm which is an idling revolution-number, the filling-up of the lubrication oil is completed within about 3 seconds at ambient temperature, and at a revolution number higher than the idling revolution number, the filling-up of the lubrication oil is completed in a far shorter time.

Although the embodiment of the present invention has been described in detail, it will be understood that the present invention is not limited to the above-described embodiment, and various modifications in design may be made without departing from the spirit and scope of the invention defined in claims.

For example, although the weirs 2c, 2c are formed integrally with the support 2 in the embodiment of this invention, weirs formed from another material may be fitted into and fixed in the annular groove 2b in the support 2. Also, separate annular grooves may be provided for the supply and discharge of oil to and from the canceller oil chamber. In addition, although the tandem type hydraulic clutch with the first and second clutch pistons 17 and 21 juxtaposed, i.e., placed side-by-side is illustrated by example in the embodiment, the present invention is also applicable to a single hydraulic clutch.

What is claimed is:

1. A hydraulic clutch, comprising, an oil supplying and discharging structure for a canceller in the hydraulic clutch, a clutch drum, a clutch piston and a canceller plate which are all supported around an outer periphery of a rotary shaft to define a clutch oil chamber between said clutch drum and said clutch piston and to define a canceller oil chamber between said clutch piston and said canceller plate, and said oil supplying and discharging structure comprising a stationary shaft fitted to an inner periphery of said clutch drum, and an annular groove defined around an outer periphery of said stationary shaft, said annular groove being divided into an oil supplying groove and an oil discharge groove by a weir means, said oil supply groove and said oil discharge groove being in communication with said canceller oil chamber through a plurality of oil holes disposed circumferentially of said rotary shaft.

2. The hydraulic clutch according to claim 1, further including a check valve interposed between said oil supply groove and said oil discharge groove, so that said oil supply groove can be put into communication with said oil discharge groove.

3. The hydraulic clutch according to claim 1, wherein said plurality of oil holes are provided in said clutch drum.

4. The hydraulic clutch according to claim 1, wherein a needle bearing is interposed between an inner periphery of said stationary shaft and an outer periphery of said rotary shaft, and said oil discharge groove being in communication with a passage in said rotary shaft through said needle bearing.

5. The hydraulic clutch according to claim 1, wherein said oil discharge groove extends through a larger circumferential arc than said oil supply groove.

6. The hydraulic clutch according to claim 1, wherein said rotary shaft has an axial oil passage for receiving oil from said oil discharge groove through at least one radial oil passage in said rotary shaft.

7. A hydraulic clutch, comprising, an oil supplying and discharging structure for a canceller in the hydraulic clutch, a clutch drum, a clutch piston and a canceller plate which are all supported around an outer periphery of a rotary shaft to define a clutch oil chamber between said clutch drum and said clutch piston and to define a canceller oil chamber between said clutch piston and said canceller plate, and said oil supplying and discharging structure comprising a stationary shaft having first annular groove means for supplying oil to said canceller oil chamber and second annular groove means for discharging oil from said canceller oil chamber, said first and second annular groove means both in continuous communication with said canceller oil chamber through circumferentially located oil passage means.

8. The hydraulic clutch according to claim 7, wherein said circumferentially located oil passage means includes a plurality of oil holes disposed circumferentially of said rotary shaft in said clutch drum.

9. The hydraulic clutch according to claim 7, further including a check valve interposed between said first annular groove means and said second annular groove means for communication of said first annular groove means to said second annular groove means upon excessive oil pressure.

* * * * *